United States Patent Office 3,146,091
Patented Aug. 25, 1964

3,146,091
METHOD AND PROCESS FOR THE EXTRACTION OF NICKEL AND COBALT FROM ORES
George E. Green, Baguio, Republic of the Philippines, assignor to Benguet Consolidated, Inc., Manila, Republic of the Philippines, a corporation of the Republic of the Philippines
No Drawing. Filed Aug. 24, 1961, Ser. No. 133,560
2 Claims. (Cl. 75—82)

The present invention relates to the extraction of nickel and cobalt from ores, and more particularly to that class of ores commonly known as laterites. These lateritic ores are known to occur at only a few points in the world, but these known occurrences represent enormous tonnages. To quote "Mineral Facts and Problems," Bulletin 556 of the U.S. Bureau of Mines, 1956, page 560:

"The nickeliferous iron ores (laterites) are the world's largest potential source of nickel. Immense deposits, measurable in hundreds of millions of tons are known in Cuba, Philippines, Celebes, and parts of Borneo. Smaller and lower grade deposits are found in Japan, Madagascar, Greece, Puerto Rico, and elsewhere. However, the average low content of nickel in the deposits, commonly a little above or below one percent, combined with the finely divided distribution of the nickel in an iron-rich material, has made it relatively costly to obtain a product of high nickel content. . . . Despite the fact that there are enormous potential reserves of nickel throughout the world, economic ore deposits are exceedingly rare."

The purpose of the present invention is the development of a method whereby these deposits can be made economically productive. These laterite ore-bodies are commonly underlain by correspondingly huge masses of serpentine rock with much lower iron content, much higher silica and magnesia content, and a nickel content that may be somewhat higher or somewhat lower than that of the overlying laterite. The present invention can also be applied to this underlying serpentine ore with satisfactory economy and metal recovery.

In only two instances have lateritic nickel ores been worked for their nickel-cobalt content. Both of these commercially exploited deposits occur in Cuba.

In one of these (the Nicaro project) the extraction is accomplished by ammonia-ammonium carbonate leaching, wherein cobalt extraction is very poor, nickel extraction is not high (averaging about 75%), technique of ore preparation prior to successful leaching is very tricky and critical, and the leaching agent is a volatile gas applied under pressure. Corrosion problems were serious. The method of extraction disclosed in the present invention does not contain any of these objectionable features.

In the other instance of commercial exploitation, leaching of nickel and cobalt is done by using large quantities of sulfuric acid at high temperatures and at high pressures. Much of the sulfuric acid applied at the high concentration and temperature employed is used, not to dissolve nickel and cobalt, but is necessarily wasted in dissolving unwanted ore impurities such as iron, aluminum, magnesia and silica. A considerable amount of acid is left over at the end of the leaching period. This is neutralized with coral lime and eventually wasted as calcium sulphate. The unit quantity of sulfur consumed per unit quantity of nickel-cobalt extracted is necessarily prohibitive to any operator except a sulfur producer with excess productive capacity close at hand. This is an extremely corrosive system. The only structural metal found capable of withstanding it is titanium. A plant built to operate under these high-pressure, high-temperature conditions and built of such expensive materials involves a capital cost that is nearly prohibitive. The method of extraction disclosed in the present invention does not contain any of these objectionable features.

It is not possible to obtain any satisfactory concentration of any of the constituents of laterite by any of the known physical, magnetic or electro-static methods. Laterite is a physical agglomeration of very small particles. The naturally-occurring laterite rock can be broken down by mild attrition in water to a point at which about fifty percent (50%) will report as minus 325 mesh after wet screen sizing. Separation of disintegrated ore by particle sizing, by magnetic separation, by gravity separation or other physical means, can be performed to show somewhat different percentages of the constituents between the various fractions, but not to the extent of any possible applicable significance. Every particle of laterite, even at minus 325 mesh, seems to contain some nickel as well as some of each of the other constituents, too much to discard but not enough to represent a potential concentrate material, even if physical separation were possible. This basic principle is also essentially true of the underlying serpentine, although the serpentine rock does not break down as easily or to such fine degree as does the laterite.

Clearly then, successful extraction of nickel and cobalt from these ores can only be obtained by a chemical process, such as leaching, and no physical pre-concentration is economically practical. The whole ore must be treated and it must be treated by chemical leaching. As stated above, such chemical leaching has been done, after suitable ore preparation, with ammonia-ammonium carbonate, a process with obviously disadvantageous features. It has also been accomplished with sulfuric acid, but at high temperature, at high pressure and in a very corrosive system in a high capital-cost plant, with a large sulfur consumption per unit-quantity of nickel-plus-cobalt recovered. The ammonia leaching method is applicable to serpentine ore as well as laterite, but the high-temperature acid leaching method cannot be applied to serpentine ore because the acid consumption on gangue would be prohibitive and the resultant pregnant solution would be saturated with unwanted soluble constituents.

Sulfur is a logical choice as the primary elementary constituent of a chemical leaching agent because of its cheapness in the form of elemental sulfur or as pyrite, and because of widespread knowledge of the characteristics of sulfate solutions. Various investigators have proposed the mixing of lateritic ores with pyrites, with sulfur, or with sulfuric acid and giving the charge a sulfating roast at temperatures above the decomposition temperature of ferrous sulfate but below the decomposition temperature of nickel and cobalt sulfates and following such roast with water-leaching of soluble sulfates. This procedure cannot be successful to a satisfactory degree because of the extremely fine state of the nickel and cobalt throughout every fine particle in the mass; even at minus 325 mesh the nickel-cobalt particles are exposed at particle surfaces to a small extent only. To obtain only a fair degree of sulfatization and recovery, a very large excess of sulfur must pass through the charge. The excess sulfur must be wasted. It cannot be re-cycled because sulfatization also requires a large excess of air (oxygen) and excess applied air cannot be bled from the system without simultaneous wastage of excess sulfur (as $SO_2$ or $SO_3$).

The present invention concerns a method which is applicable to either the overlying laterite or the underlying serpentine ores. It is preferable to treat the two separately, so that the leached residue from the serpentine ore will not be detrimental to the subsequent use of the leached residue from the laterite as a source of high-Fe content iron ore. The present invention also discloses a method wherein the technique of ore preparation is not so delicate as that required for ammonia leaching, and is a method wherein leaching is done at ordinary temperature, at atmospheric pressure, in a system with low corrosive characteristics, and without any necessity of sealing the leaching system against escape of volatile gases. Furthermore, it is a method wherein the recovery percentagewise of both nickel and cobalt is highly satisfactory at a sulfur consumption of two lbs. of sulfur per lb. of nickel-plus-cobalt recovered.

In leaching nickel, as in the leaching of copper from ores, the dissolving action of acid-type reagents can be made selective as to nickel over iron and, to a greater degree, over gangue constituents. This preferential selectivity can be improved by leaching with as dilute or as weak an acid as is practical, by leaching at ordinary temperatures rather than elevated temperatures, by leaching at as coarse a size as will present satisfactory recovery in reasonable time and by stopping the leaching action as soon as satisfactory recovery has been obtained.

Nickel is contained in laterite and serpentine ores as nickel silicate (garnierite) $H_2(NiMg)SiO_4 \cdot H_2O$. This silicate is, to a large extent, buried inside each tiny ore particle and is not exposed to easy attack by leaching agents. Also, this silicate is not too readily soluble even when exposed so that favorable selectivity is not easily obtained in acid leaching. If this silicate mineral of the above formula were dissolved, it is difficult to see how such solution could take place without the concomitant solution of one molecule of magnesia and one molecule of silica for each atom of nickel dissolved, with the resultant waste of acid on unwanted constituents and consequent unwanted fouling of leaching solution.

If these ores, laterite or serpentine, are reduced by roasting in a carbon monoxide atmosphere, the nickel and cobalt is easily reduced to metal. The iron are partially reduced but the preferential solubility of nickel-cobalt over iron in acid solution is greatly enhanced. In the subsequent leaching, magnesia and silica are not dissolved in as great a ratio to nickel as their ratio of occurrence in the garnierite formula. Thus, such a reducing roasting prior to leaching is a simple and valuable means of pre-disposing the nickel-cobalt to preferential selective attack by dilute acid leaching agents. Of course, laterite and serpentine ores can be reduced by roasting in a hydrogen atmosphere, or in a mixed $CO-H_2$ atmosphere, but I have found that the subsequent preferential solubility is most favorable, as regards nickel-cobalt over iron, when carbon monoxide is employed. In my preferred method, the ore is first dried at 350 deg. C. to expel all free moisture, as well as combined water. The combined water amounts to 10 to 12% of the weight of laterite ore which has been dried at 100 deg. C., and combined water amounts to 4 to 5% of the weight of the serpentine ore which has been dried at 100 deg. C. It is preferable to expel this combined water prior to reduction, since the combined water in its vigorous evolution from the ore mass tends to drive out reducing gases from the mass too rapidly for reaction if such combined water is not previously expelled. I prefer to perform this drying-driving off of combined water in a rotary kiln, but any suitable drying apparatus can be employed.

The ore, with all possible water ($H_2O$), expelled, is then reduced in size to essentially all minus 100 mesh. By essentially all, I mean ninety-five percent (95%) or more as practiced in my preferred method. In this preferred method, I use a hammer mill, but any suitable dry grinding apparatus can be employed for such size reduction. These ores are soft, they disintegrate easily and little force is required for such diminution.

In my preferred method, the ores are then mixed with 3% to 5% of their own weight in minus 10 mesh coal and roasted for two hours at 850 deg. C. Very little movement of the ore is necessary during this reducing roasting, but rabbling or tumbling does no harm if such movement is necessary to move ore through the roasting apparatus. I have found that minus 10 mesh coal is a good size to use as that size is small enough to permit sufficient mixing yet is not so small as to permit flashing or dusting. Three percent (3%) of ore weight to coal is a sufficient reducing agent when the evolving gases are closely confined, but when a hearth-type roaster is used, gases are more easily vented to waste and five percent (5%) coal may be found necessary. Reducing temperatures somewhat lower than 850 deg. C. can be used but results will be inferior unless the temperature is but little lower and longer roasting time is given. The temperature must never exceed 871 deg. C. because at that temperature the nickel-cobalt metal reverts to a synthetic serpentine mineral and becomes almost insoluble. The reduced charge must not be given a chance to re-oxidize, which it will readily do if discharged hot into air. It can be cooled in a reducing atmosphere, but the simplest course and my preferred expedient is to discharge it under water. As soon as the reduced charge is cooled it has no tendency to re-oxidize. It is easy to judge whether or not the reducing roasting has been successful on the laterite ore. The product from a successful roasting will be almost all (98 to 99%) magnetic to a hand magnet. The success of the reducing roast on serpentine can best be judged by actual determination of the percentage of nickel soluble in dilute sulfuric acid.

Laterite loses about 11% of its weight when combined water is removed, and loses about 9% more during reduction with a corresponding increase in its percentage of each metal constituent. A laterite containing 1.18% Ni when dried of free moisture only, assayed 1.42% Ni after reduction roasting. This means that a raw ore containing 23.6 lbs. of nickel per ton will be incidentally beneficiated to a leaching feed containing 28.2 lbs. nickel per ton. The value of this up-grading before leaching may be equal to the cost of the roasting. With serpentine ores, the reduction of weight and consequent raising of assay values is inconsiderable.

After the above-described reduction roast, the ore is in a condition which pre-disposes it to the preferential selective leaching of nickel and cobalt.

As stated above, preferential selectivity in leaching can be enhanced by using more dilute strengths of leaching solvent. It is desirable then, in order to obtain the greatest selectivity, to use as weak a solvent strength as possible. When using sulfuric acid as leaching solvent, the greatest selectivity is obtained when using very weak concentrations of acid, but as weaker and weaker acid strengths are employed, a point is reached where leaching action becomes very slow and leaching time necessary for sufficient degree of extraction becomes excessive. Also, with the use of sulfuric acid as leaching agent, no effective leaching of nickel-cobalt takes place unless the pH of the leaching solution is below 1.5. Since, for effective leaching, it is necessary to maintain pH below 1.5, it follows that final pregnant solution discharged from the leaching system must be below pH 1.5. Since pH 1.5 is too strongly acid for Ni—Co precipitation and partial neutralization would be necessary, it is evident that the acid used to drop the pH from neutral to 1.5 represents a sheer waste of acid and the reagent expense for neutralizing such acid entails another waste item of expense to be avoided if possible.

I have discovered that ferric sulfate, $Fe_2(SO_4)_3$, will readily dissolve nickel and cobalt from laterite and serpentine ores which have been prepared by the drying and reducing roast steps as described above and that ferric sulfate readily dissolves nickel and cobalt from ores thus prepared more preferentially and selectively than does sulfuric acid and that ferric sulfate is an effective solvent at a pH range in which sulfuric acid is not readily effective, that is, at pH 2.0, at pH 3.0, or even higher. This means that the utmost degree of preferential selectivity can be obtained. Ferric sulfate can be made in a ferrous sulfate solution by introducing sulfuric acid and oxygen (as air), according to the formula $$2FeSO_4 + H_2SO_4 + \tfrac{1}{2}O_2 = Fe_2(SO_4)_3 + H_2O$$

To make this reaction take place, it is not necessary to have sulfuric acid present, at any time, in sufficient concentration to readily attack iron or gangue minerals. The ferric sulfate generated dissolves nickel and cobalt preferentially over iron and gangue minerals and is an efficient solvent at any pH that would be employed in my preferred method. The ferric sulfate is not added to the system as such, but is generated from the addition of sulfuric acid and air to recycled solution that has been used in a previous leaching cycle. This used solution contains ferrous sulfate. When used solution is not available, I apply two parts by weight of dilute sulfuric acid solution containing 20 grams $H_2SO_4$ per liter to one part by weight of reduced laterite in an agitator equipped for aeration of the pulp. Only mild aeration is needed. When starting off with this strength of sulfuric acid (2% or 20 grams per liter) some nickel and cobalt and some iron will go into solution. The reactions would soon slow down because of the diminishing acid strength, but the aeration plus the presence of the remaining free $H_2SO_4$ results in the generation of ferric sulfate and the highly selective leaching of nickel and cobalt gets under way. This agitation-aeration is continued for one hour, then an additional 20 grams sulfuric acid per liter is applied. After the second hour a third addition of 20 grams sulfuric acid per liter of solution is applied and the third agitation period is then prolonged to two hours, making a total leaching cycle of four hours. In commercial practice, this leaching would be done in four agitation units in series, each of a size sufficient to give the pulp one hour residence time and the acid would be added at the rate of 20 grams per liter of solution flow to each of the first three units.

The reduced pulp at the end of leaching is fast-settling and filters quite well. Separation of solution from pulp can be helped by the fact that this pulp is still 99% magnetic. In my preferred method, I discharge the final agitator onto a troughed belt which passes around a magnetic head pulley. This pulley remove more than 99% of the solids. The solids retain about 57% moisture. Any amount of water necessary for washing, up to a maximum equivalent to this 57%, can be applied to wash the solids free of entrained pregnant solution. The wash water and the first solution separated (at the magnetic pulley) are combined. In volume, they will equal the volume originally applied at the head of the leaching cycle. This combined solution is then agitated for one hour with a new, freshly reduced batch of heads ore. This procedure results in the fullest possible use of the sulfuric acid and ferric sulfate. It results in a pregnant solution that is about 50% higher in nickel and cobalt content than is otherwise economically possible. It also results in a final pregnant solution that has a pH of about 3.0, a workable range, and this has been achieved without the use of any wasteful added ingredient to bring about such partial neutralization.

On the contrary, when partial neutralization is brought about by fresh ore itself, the partial neutralization results in the solution of considerable nickel-cobalt values. Another valuable feature is that in such partial neutralization (to pH 3.0) approximately half of the dissolved iron in solution is precipitated out upon the fresh, reduced ore, and the Fe:Ni ratio of 3.2:1 previously found in the solution is lowered to 1.6:1. This means that although, iron to nickel exists in the heads in the ratio of 40:1, iron to nickel in the pregnant solution going to precipitation exists in the ratio of 1.6:1, only.

Another great advantage of this feature of agitating pregnant solution with freshly reduced heads, is that the entrained moisture on the solids, after such contact, need not be fully removed or completely washed out since that pulp still has to go through the regular leaching cycle.

This solution at this point has a higher nickel-cobalt content than any other solution in the system, and it is the very solution of which none will be lost. The solution at the end of the regular leaching cycle is the one that might not be 100% recovered (due to insufficient washing) but that solution is much lower in values and the possible soluble loss (nickel in entrained moisture in discharged tailings) will be less serious.

There is no difficulty in maintaining the water balance in this system. Water is added at two points only, as wash water at the magnetic pulley separation and as wash water just prior to final tailings discharge. Water is taken out at two points, as moisture entrained in final tailings and as the water-balancing bleed-off after nickel-cobalt precipitation. Since such full use has been derived from the applied sulfur (as $H_2SO_4$ used with air to generate ferric sulfate) there is no considerable loss of reagent in such bleed-off.

The final pregnant solution (which has just been in contact with fresh reduced heads after passing through the regular leaching cycle) is ready to go to clarification and precipitation, either with or without prior concentration by ion-exchange or solvent extraction methods. This precipitation of nickel and cobalt can be performed by any of the standard commercial procedures which may be applicable. The present invention relates only to the extraction of nickel and cobalt from laterite and serpentine ores. Serpentine ores are treated exactly the same as laterite but acid additions are about 10% higher. It is easy to prove that ferric sulfate, in itself, will readily dissolve nickel and cobalt from ores prepared and reduced as described above. I have placed 20 grams reduced ore (100 mesh), 2 grams ferric sulfate crystals, and 100 ml. distilled water in a small closed jar and rolled it for one hour. The pH at the start was 2.20 and the pH at the end of the hour was 4.15. The head assay was 1.42% Ni and 0.095% Co. The assay of the washed residue at the end of the hour was 0.56 Ni and 0.049 Co.

In experimenting with the method disclosed in the present invention, I have used a laterite sample which, in the air-dried condition (combined water not removed) assays 1.18% Ni and 0.08% Co. After reduction roasting, the heads assay 1.42% Ni and 0.095% Co. After the freshly-reduced ore contact with leaching-cycle tails solution and the regular four hour leaching cycle, the washed residue assays 0.065% Ni and 0.023% Co, showing a nickel recovery of about 95.5% and a cobalt recovery of 76%. The nickel recovery can be augmented to practically 100% by extending leaching time or by adding acid to the last agitation stage, but such procedure may or may not be economically advisable in commercial practice. The total sulfur consumption was 2 lbs. sulfur per lb. of nickel plus cobalt extracted. This means that for each 1,000 tons of laterite (naturally-dry basis) treated, there would be required, 24 tons elemental sulfur, or 72 tons sulfuric acid, or 52 tons of 45% sulphur pyrite ore. Leaching was done at 33⅓% solids and final pregnant solution going to precipitation contained 10.66 grams nickel per liter and 16.40 grams iron per liter of solution.

In experimenting with the method disclosed in the present invention, I have used a serpentine sample which in the naturally-dry condition assayed 1.41% Ni and 0.04% Co. After reduction roasting, the heads assayed 1.524% Ni and 0.045% Co. When this was leached exactly the same as laterite, except for addition of acid in amounts 10% greater at each addition, the washed residue at end of leaching assayed 0.135% Ni and 0.019% Co showing an extraction of 91.14% of the nickel and 56% of the cobalt, with a sulfur consumption of 2.35 lbs. per lb. Ni+Co extracted. Comparative extraction tests made on these same reduced heads, using the ammonia-ammonium carbonate leaching procedure, gave very inferior results, nickel extractions being below 70% in every instance that it was attempted on either laterite or serpentine.

The reduced serpentine is not magnetic to the extent that reduced laterite is. The magnetic separation is not applicable on serpentine ores.

The magnetic characteristics of reduced laterite is due to magnetite, $Fe_3O_4$, formed in the reducing roast. Under my specified roasting conditions, there is no reduction to metallic Fe, but to $Fe_3O_4$ only. The absence of metallic Fe is proved by the fact that the reduced laterite product will not precipitate any metallic copper from copper sulfate solutions.

The final leached residue from the laterite ore assays 56 to 57.5% Fe. The combined nickel-plus-cobalt assay is below the maximum allowable in iron ore and no deleterious element has been introduced during the process. This residue, then, needs only to be freed of chromium to constitute a valuable high-grade iron ore.

A typical example of my preferred method is described and tabulated as follows—

A sample of laterite (representing a composite of many pits dug in the deposit) was dried for 24 hours at 100 deg. C. The sample then assayed 1.18% Ni, 0.08% Co and 46.25% Fe. This sample was then heated to 350 deg. C. for one hour to remove the combined water. The sample was then mixed with 3% of its own weight in minus 10 mesh low-grade coal and roasted for two hours at 850 deg. C. in a piece of four-inch steel pipe, fourteen inches long, with one end capped and the other end reduced down to a half-inch opening. The pipe was revolved a half-turn several times during the roast. The reduced charge was allowed to cool before opening, to prevent re-oxidation. 500 grams of reduced charge was agitated for one hour with aeration in one liter of solution taken from the end of a previous leaching cycle. The solids were then separated from the solution with a hand magnet. The solution, which leaves the leaching circuit at this point and goes to precipitation, had a pH of 3.06 and assayed 10.664 grams Ni per liter, 16.40 grams Fe per liter, 11.60 grams ferrous Fe per liter, and 4.80 grams ferric Fe per liter. The solids, unwashed, with the entrained moisture still present was then agitated, with aeration, with one liter of water containing 20 grams sulfuric acid, for one hour. 20 grams sulfuric acid was then added and agitation continued for the second hour. 20 grams sulfuric acid was then added and agitation continued for the third hour. The agitation-aeration was continued for the fourth hour but no acid addition was made. Assays were made, at the end of each hour, on the residue.

|  | Ni, Percent | Fe, Percent | pH of Solution |
| --- | --- | --- | --- |
| Residue after 1 hour | 0.443 | 56.5 | 2.08 |
| Residue after 2 hours | 0.276 | 57.0 | 1.52 |
| Residue after 3 hours | 0.150 | 57.3 | 1.36 |
| Residue after 4 hours | 0.065 | 57.5 | 1.82 |

My process for extraction of nickel and cobalt from laterite and serpentine ores, as disclosed in the present invention, includes the following steps.

(1) Ore is dried at temperature sufficient to remove all combined water.

(2) Ore is comminuted to 95% minus 100 mesh.

(3) Ore is mixed with from 3 to 5% of its own weight in minus 10 mesh coal and given a reducing roast for 2 hours at 850 deg. C. The reduced charge is not allowed to re-oxidize while hot. When cold there is no danger.

(4) Reduced ore is agitated with aeration for one hour with used solution which has been derived from end of previous leach cycle. After this hour's agitation, this solution is separated, without washing, and goes to precipitation.

(5) Reduced ore, after pre-leach of step 4, is repulped to 33⅓% solids with water derived in so far as possible from precipitation tails (especially if electrolytic precipitation is employed) and sulfuric acid added at the rate of 20 grams $H_2SO_4$ per liter of solution. The charge is then agitated with aeration for one hour.

(6) Sulfuric acid, at the rate of 20 grams per liter of solution is added and agitation-aeration continued for the second hour.

(7) Sulfuric acid, at the rate of 20 grams per liter of solution is added and agitation-aeration continued for the third hour.

(8) No acid addition is made, but agitation-aeration is continued for the fourth hour.

(9) Solution and solids are separated, with thorough washing. Solids are final tails and solution is contacted with freshly reduced heads for the pre-leach agitation of step 4.

My process may also be summarized as follows:

First, dry the ore at about 350 degrees C. to expel all free moisture.

Second, reduce the size of the ore to essentially all minus 100 mesh.

Third, mix the reduced particle size ore with from 3 to 5 percent of its own weight with minus ten mesh coal and roast for two hours at a temperature from about 850 degrees C. to not over about 871 degrees C. in a carbon monoxide atmosphere.

Fourth, cool the reduced charge by discharging it under water.

Fifth, subject the ore to the preferential selective leaching of nickel and cobalt by the use of ferric sulfate.

Sixth, start the leaching cycle by applying two parts by weight of dilute sulfuric acid solution containing 20 grams $H_2SO_4$ per liter to one part by weight of reduced laterite under mild aeration and agitation for one hour to generate ferric sulfate.

Seventh, at the end of the hour, add an additional 20 grams sulfuric acid per liter for a second hour.

Eighth, at the end of the second hour add another 20 grams sulfuric acid per liter of solution and continue the aeration and agitation for another two hours, making a total leaching cycle of four hours.

Ninth, as the end of the cycle in the treatment of laterites magnetically remove the solids.

Tenth, wash the solids free of entrained pregnant solution, with water.

Eleventh, combine the wash water with the first solution derived from the magnetic removal of the solids.

Twelfth, agitate the combined solution for one hour with a freshly reduced batch of heads ore.

Thirteenth, precipitate the nickel and cobalt from the final pregnant solution.

Fourteenth, free the residue of the treated ore from chromium, for recovery of high grade iron ore.

There will be a small amount of unburnt coal found in the residue after roasting. This can be removed by magnetic means, by gravity separation, by size classification or other means if such removal proves necessary.

While there is herein described, but one principal process, and conditions of application are rather rigidly specified, the present invention is intended to include all reasonable equivalents of the steps specifically set out herein, as will occur to those skilled in the art from the foregoing disclosure.

What is claimed is:

1. A method of extracting nickel and cobalt comprising heating a quantity of a serpentine ore containing a quantity of iron to expel substantially all free and combined moisture therefrom, comminuting the dried ore to substantially all minus 100 mesh screen particles, roasting the comminuted ore in an atmosphere of carbon monoxide at a temperature of between 850 and 871 degrees centigrade to reduce the same, cooling the reduced ore under non-oxidizing conditions to form a batch of cooled, reduced ore, adding a two percent solution of sulfuric acid to said batch of cooled, reduced ore whereby the acid selectively reacts in the presence of air with the iron present to form a ferric sulfate leaching solution, agitating the mixture of cooled, reduced ore and leaching solution to form a pulp material and a pregnant solution containing nickel and cobalt dissolved therein, and separating said pulp material from said pregnant solution.

2. The method of claim 1 wherein a plurality of quantities of ore are successively treated for the extraction of nickel and cobalt, said batch of cooled, reduced ore resulting from the reduction of each quantity of ore being agitated with said pregnant solution from the preceding quantity of ore prior to the addition of said two percent acid solution.

References Cited in the file of this patent
UNITED STATES PATENTS

| | | |
|---|---|---|
| 981,451 | McKechinie | Jan. 10, 1911 |
| 1,346,175 | Caron | July 13, 1920 |
| 2,478,942 | Queneau et al. | Aug. 16, 1949 |
| 2,576,314 | Forward | Nov. 27, 1951 |
| 2,775,517 | Mancke | Dec. 25, 1956 |